Nov. 29, 1955

E. J. SCOTT 2,725,540

SLIP RING ASSEMBLY

Filed Dec. 15, 1948

INVENTOR
ELMER J. SCOTT
BY
ATTORNEY

Nov. 29, 1955  E. J. SCOTT  2,725,540
SLIP RING ASSEMBLY
Filed Dec. 15, 1948
2 Sheets-Sheet 2
FIG. 8
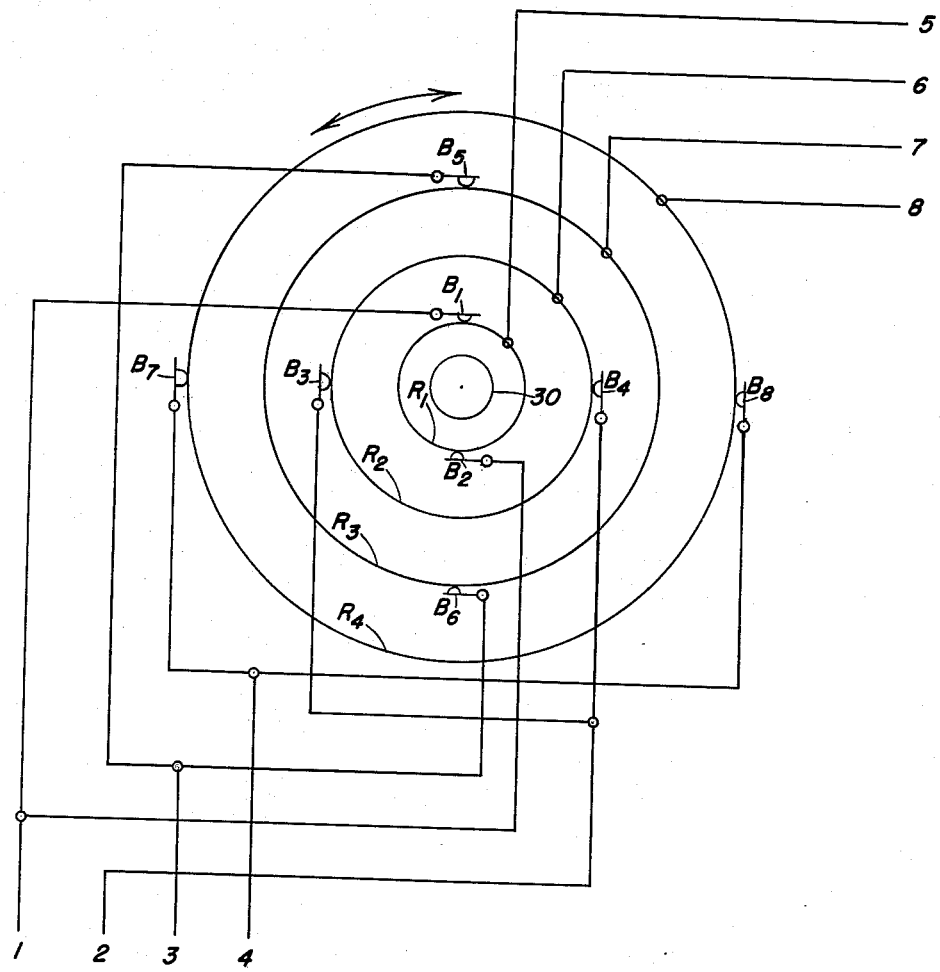
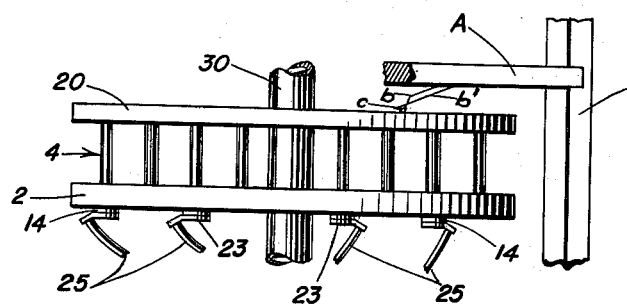
FIG. 7
INVENTOR
ELMER J. SCOTT
BY
ATTORNEY

2,725,540

Patented Nov. 29, 1955

2,725,540

SLIP RING ASSEMBLY

Elmer J. Scott, Silver Spring, Md., assignor, by mesne assignments, to the United States of America as represented by the Secretary of the Navy Application December 15, 1948, Serial No. 65,497

2 Claims. (Cl. 339—5)

(Granted under Title 35, U. S. Code (1952), sec. 266)

This invention relates to an apparatus for maintaining a plurality of electrical circuits on a warship through members which are arranged to be moved rotatively relative to each other and more particularly to a slip ring assembly which is characterized by high impedance leakage paths between the various rings of the assembly and similar paths between the brushes associated therewith, uniformly low contact resistance between the moving and stationary members, and low capacitance between adjacent rings.

The invention is especially adapted for use in a gun fire control system employing a director, or similar structure, which is mounted upon a ship's deck and which is adapted to be rotated in train through an axis substantially perpendicular to the deck and at the same time utilize electric circuit connections between various electrical apparatuses to be described which are located in the director and in the ship. There have been devised various gun fire control systems which employ radar and it is to be understood that the invention of this application may be employed advantageously in connection with such systems and, if desired, in systems which are controlled manually. Furthermore, such radar controlled systems employ not only radar equipment but involve electrical circuits of widely different transmission levels.

This invention further provides a superior and unique means especially designed for use in a radar controlled gun fire control system which will meet the operational problem of anti-aircraft defense from shipboard against both new weapons and new aircraft tactics required by the equipment and armament of modern warfare involving mass aircraft attack.

The apparatus of the present invention is particularly adapted for use with the Gun Fire Control Method and System described and claimed in the copending application of Ivan A. Getting, Serial No. 61,558, filed November 23, 1948.

This radar controlled system, specifically designed to meet the requirements of space, manpower, weight, complexity, range, performance and speed, and automatically commensurate with the efficient operation of, and limitations imposed by, the gun under the conditions of modern warfare, comprises means whereby there is automatic radar tracking of the target and whereby all devices adapted to impart radar information may be placed below deck, while the director may be remotely controlled, as contrasted with the prior practice of controlling the director from within its structure.

In gun fire control systems of the type heretofore proposed, it has been the usual practice to establish the necessary control power connections between the devices within any movable director and the control elements therefor on the vessel by means of a length of cable having a plurality of conductors therein, which cable is twisted as the director is rotated about its axis. Such devices, of course, limit the number of rotations in a particular direction of movement which occur in succession, as, obviously, if a sufficient number of rotations in a particular order are applied in succession, the cable would be damaged sufficiently to render the gun ineffective.

Slip rings of the type to be here described make it possible to mount the director on the deck or to install the same in locations not available to the conventional cable-twist director. Accordingly, it is an object of this invention to utilize to the fullest extent the knowledge acquired by experience as to the superiority of slip rings over cable twists heretofore used and to overcome the objection of the conventional drums which, when shocked, tend to push the brushes out of contact with the contact elements.

Another special feature of the invention is that this new slip ring assembly, especially constructed for use on search radars, is capable of permitting such desirable freedom of rotation that there is obviated the usual danger of losing the target when the director has reached its limit of train motion and continuous searching is permitted.

As is well known, the horizontal rotary movement of a gun may be accomplished by a reversible electric motor in which the direction of movement and extent of such movement is controlled by the motor servo system. In order to obtain the high degree of synchronization between the servo control and signal elements, it is necessary that the circuits therebetween be so constructed and arranged as to possess the characteristic of constant resistance regardless of the direction or degree of movement of the gun turret, the shock applied thereto as a result of the gun fire or explosions within the vicinity of the turret, and the corrosive and leakage effect of waterspray or humidity which may be present.

The apparatus of the subject invention is such that these circuits may be sufficiently maintained with a minimum of leakage and capacitive coupling between the circuits and with a minimum of disturbance of the usual circuit transmission characteristics due to contact irregularities and resistances. By reason of employing an air dielectric between adjacent rings of the assembly, it is possible to obtain minimum capacitance.

As will be more fully disclosed hereinafter, these advantages are primarily achieved through a structural arrangement in which the resistance of the necessary electrical leakage path is high by reason of a relatively small cross section of air dielectric between adjacent rings, while at the same time the length of the leakage path is greater by reason of the arrangement of the ring-supporting pins as will more clearly appear as the description proceeds.

Another object is to provide a new and improved slip ring assembly for a radar controlled gun fire system in which air is employed as a dielectric between the rings.

Another object is to provide a slip ring structure of new and improved construction in which the leakage resistance between the rings is of a high order.

Still another object is the provision of a new and improved slip ring assembly which is compact and which possesses the desired qualities of substantially unchanged contact resistance between the contacting elements as a shock is applied thereto.

A still further object is the provision of a new and improved means for preventing misalignment between the director and the internal control mechanism therefor while the gun is being aimed and fired.

Still other objects, advantages and improvements will be apparent from the description taken in connection with the accompanying drawings, of which:

Fig. 7 is a view in elevation showing the brush arrangement employed with the ring structure in accordance with the preferred form of the invention; and Fig. 8 is a schematic view showing the ring and brush circuit connections.

Referring now to the drawings more in detail, in which drawings like numerals or references are employed throughout the several views to designate like parts therein, the invention will be described more in detail.

Figure 1:
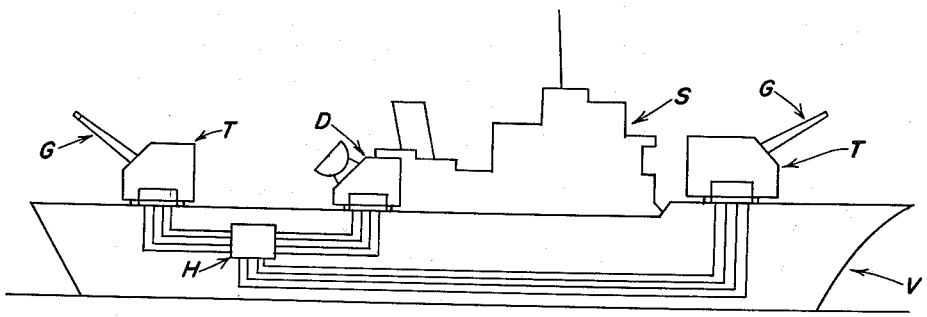
Fig. 1 is a diagrammatic view of a ship employing the apparatus of the present invention.
Figure 2:
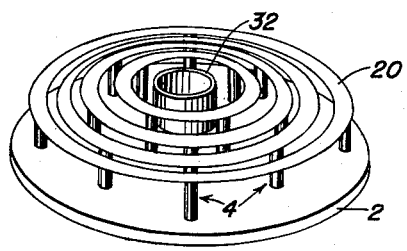
Fig. 2 is a perspective view of a slip ring assembly in accordance with the preferred embodiment of the invention and with the brushes removed.

With more particular reference to Fig. 1, there is shown a vessel V provided with a plurality of turrets T supporting guns G.

The gun fire control mechanism in general includes the usual director D, located above deck, and a housing H which is located below deck according to the preferred form of the invention and which includes the computing apparatus, radar control circuits, timing devices, etc., and it is to be understood that when gun fire control mechanism is hereinafter referred to, any part, or all of, such associated apparatus is intended, as the case may be. A ship's superstructure is located at S and the particular relative location of these variously designated parts may be varied.

There is a base or disc member 2 formed of some suitable insulating material, such as plastic or the like. This member 2 will usually be circular in shape, as shown, but it is to be understood that shape or size does not comprise any part of this invention although the same preferably have flat surfaces for reasons to be apparent.

Figure 5:
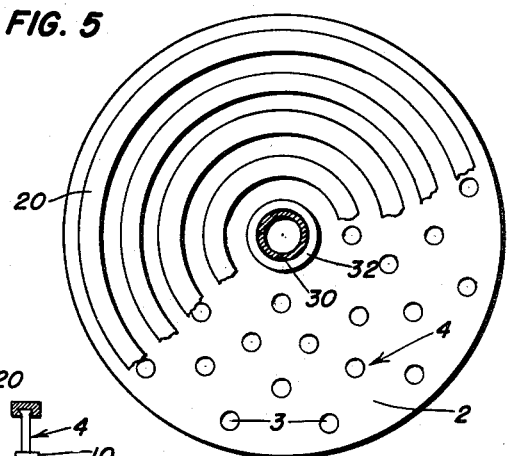
Fig. 5 is a top plan view partly in section of the supporting plate showing the staggered arrangement of the pins.

The base 2 is provided with a plurality of spaced openings 3 which extend entirely therethrough and which are disposed in groups, said groups in effect being arranged to provide a plurality of concentric rings of holes 3, as shown. Preferably the openings 3 of these adjacent concentric groups are circumferentially staggered relative to one another, as shown clearly in Fig. 5, to provide a leakage path of maximum resistance therebetween.

A plurality of metallic conducting stilts or pins 4 are provided and one of these is anchored in each opening 3 and, consequently are likewise arranged in concentric groups or ring-forming relation. The pins 4 of adjacent rings thereof are also consequently circumferentially staggered relative to one another, according to the preferred form of the invention in order to conform with the staggered relation of the holes 3 in which they are received.

Figure 6:
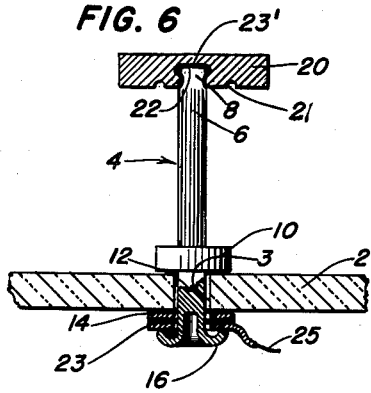
Fig. 6 is a partial elevational view in section of the device showing the specific pin structure.

The upper end portions 6 of the supporting stilts or pins 4 are preferably turned to have an annular groove 8 adjacent their top ends, particularly as viewed in Fig. 6, and each pin 4 may have an enlarged collar or shoulder 10. The lower end portions 12 of pins 4, which are disposed below these parts 10, will be hollow, for reasons about to be described.

In assembling the device, the stilts 4 are arranged to extend entirely through the openings 3 with their shoulders 10 disposed adjacent one surface of the base so as to limit movement thereof in one direction relative to the base. Then the hollow end portions 12 are spun-riveted so that their extremities flare outwardly, as at 16, in different directions and serve to clamp the supports 4 securely to the disc 2. There will preferably be bushings or washers 14 disposed around parts 12 just below the opposite surface of the base 2, as viewed in Fig. 6.

A plurality of concentric rings, designated by numeral 20, are provided and these are preferably formed of solid coin silver. As shown, they may be counterbored to provide notches or cuts 22 in their under sides for snugly receiving the upper extremities of the stilts or pins 4 and the rings 20 swaged around these notched portions, as indicated by the numeral 21, so as to extend into the grooves 8 and preferably be soldered thereto, as indicated by 23', whereby the rings 20 are firmly anchored to supports 4, all as viewed in Fig. 6.

A lug 23 for an electrical connection may be disposed between each washer 14 and the flared terminations 16 of the stilts. As will be obvious, these are for connecting the slip ring assembly to the source, or sources, of electrical energy (not shown).

Figure 4:
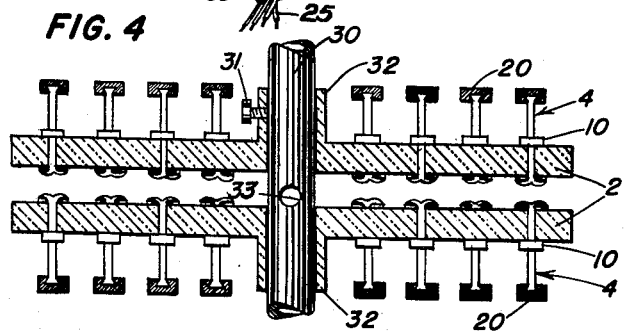
Fig. 4 is a view similar to Fig. 3 showing a pair of the assemblies mounted in assembled relationship with the wiring removed.

According to one embodiment of the invention, the ring-supporting discs 2 may be mounted in pairs in back-to-back or so-called "pan-cake" relation, as shown in Fig. 4, in order to provide a more compact construction. In this event, radial and complemental notches (not shown) will be provided in their adjacent faces, as by molding, so as to accommodate the wires 25 which lead to the lugs 23.

With reference to Fig. 7, the device of the invention is shown mounted on a hollow supporting shaft 30 carried by, and rotatable with, the turret or director, as the case may be. The discs 2 may be provided with collars 32 for receiving this shaft, as shown more clearly in Fig. 4. In further reference to Fig. 7, there is shown for purposes of clarity in disclosure, a brush member including a pair of leaves b—b', preferably of beryllium copper, and a spheroidal contact button c on the tip of the longer leaf. The buttons c are preferably composed of silver graphite and being in free but frictional engagement with the rings 20. It has been found that a construction made according to the preferred embodiment of the invention may result in a contact force on each button of 1½ ounces, each button being rated conservatively at one ampere.

According to the construction of this invention the brush members are maintained in proper contact with the rings at all times despite the inevitable shocks encountered by such devices employed on war vessels or in other suitable locations for radar-controlled gun fire control systems. For purposes of clearness in the showing, there is also shown in Fig. 7, a substantially vertical supporting post P having a radial arm A. These parts constitute the brush holding means for securing the leaves b—b' at one end thereof, and the post P will normally be connected to vessel V.

Figure 3:
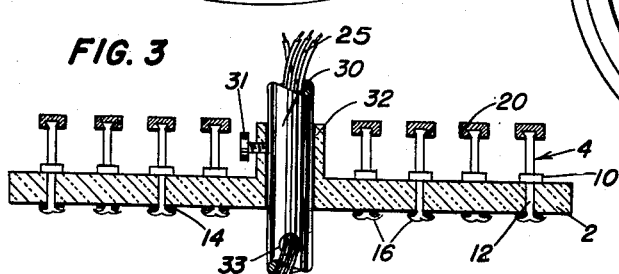
Fig. 3 is an enlarged sectional view through what is shown in Fig. 2 showing the usual wiring.

According to the preferred embodiment of the invention, the wires 25 extend upwardly through the hollow shaft 30, as shown in Fig. 3, so that their upper ends may be connected to the control mechanism and their lower ends may extend outwardly through an opening 33 provided in the shaft so as to lead to, and be connected with, the lugs 23, as indicated in Fig. 6. The slip ring assembly is secured in fixed relation with shaft 30 by any suitable means, such as being keyed thereto by a key or set screw 31 extending through collar 32 of the discs 2 and engaging shaft 30, also as shown in Figs. 3 and 4.

With reference to Fig. 8, there is shown diagrammatically how four rings R1, R2, R3, and R4 may be connected in circuit with contact brush parts designated at B1 through B8, inclusive, through connections 1 and 5, 2 and 6, 3 and 7, and 4 and 8. It might be here pointed out that radar is preferably an integral part of this new gunfire control system and that the arrangement is such that accurate data is automatically and continuously furnished to the tracking and computing contrivances of the system contained in H. Operating and servicing tests showed the desirability of locating the receiver-power-supply above deck and the novel slip ring assembly of this invention was designed specifically towards this end and a new director construction was provided in order to accommodate a slip ring assembly which could be placed alongside the receiver.

In conclusion, there is here provided a unique slip ring assembly for use in such equipment in order to make efficient electrical connections between relatively rotating and stationary members. As stated previously, in radar apparatus, particularly, the rings must introduce no circuit disturbance and provide a maximum leakage path in the system and since such equipment is commonly shipborne, the assembly should take up a minimum of space and yet be firm and moisture-proof. This new assembly does provide a linkage path of increased length with coined-silver concentric rings firmly anchored in an insulating base with an air dielectric between adjacent or successive rings and so arranged that the possibility of appreciable collection of moisture is obviated.

Further, the construction is relatively light in weight and it is so compact that it may be readily incorporated in a gun director while occupying a minimum of space and performing with maximum efficiency. Yet the structure is simple in form so as to be relatively easy and economical to manufacture.

Obviously many modifications and variations of the present invention are possible in the light of the above teachings. It is therefore to be understood that within the scope of the appended claims the invention may be practiced otherwise than as specifically described.

The invention herein described and claimed may be manufactured and used by or for the Government of the United States of America without payment of any royalties thereon or therefor.

What is claimed as new and desired to be secured by Letters Patent of the United States is:

1. In a slip ring assembly of the character disclosed, a substantially horizontally extending disc-like base of insulating material provided with a plurality of spaced openings therethrough arranged in concentric groups, a plurality of metallic stilts arranged in groups respectively and supported vertically on said base in each of said openings, each of said stilts being provided with a hollow portion disposed below said base and a shoulder disposed above the base to limit downward movement of said stilts relative thereto, a plurality of concentric metallic rings respectively carried by the upper portions of said stilts of each group, and electrical connections carried by said hollow portions of the stilts, said hollow portions being spun-riveted to thereby clamp the stilts to said base and to fasten said connections in place.

2. In a slip ring assembly of the character disclosed, a substantially horizontally disposed disc-like base member of insulating material provided with a plurality of spaced openings extending therethrough and arranged in concentric ring formation, a plurality of substantially vertically disposed metallic stilts arranged in groups supported on said base member and in each of said openings respectively, each of said stilts having an annularly grooved upper portion located above said base and a lower spun hollow portion which projects below said base, a plurality of concentric metallic slip rings provided with notches in their lower sides to receive said upper grooved portions of the stilts, said grooved portions being respectively fixed in said notches, and electrical connections carried by said spun portions of said stilts and secured to the base thereby.

References Cited in the file of this patent
UNITED STATES PATENTS

| | | |
|---|---|---|
| 1,143,948 | Dawson et al. | June 22, 1915 |
| 1,481,729 | Nafziger | Jan. 22, 1924 |
| 2,415,967 | Pontius | Feb. 18, 1947 |
| 2,444,246 | Chase et al. | June 29, 1948 |
| 2,450,541 | Chase et al. | Oct. 5, 1948 |